United States Patent [19]
Takatori

[11] Patent Number: 5,363,167
[45] Date of Patent: Nov. 8, 1994

[54] PHOTOGRAPHIC FILM CASSETTE HAVING A LOCKING SPOOL

[75] Inventor: Tetsuya Takatori, Kanagawa, Japan

[73] Assignee: Fuji Photo Film Co., Ltd., Kanagawa, Japan

[21] Appl. No.: 964,290

[22] Filed: Oct. 21, 1992

[30] Foreign Application Priority Data

Oct. 21, 1991 [JP] Japan ................... 3-320064

[51] Int. Cl.$^5$ .................. G03B 17/26; G03B 1/04
[52] U.S. Cl. ...................... 354/275; 242/348.4
[58] Field of Search ............. 354/275, 231; 242/71.1

[56] References Cited

U.S. PATENT DOCUMENTS

| | | | |
|---|---|---|---|
| 4,407,579 | 10/1983 | Huff | 354/275 |
| 4,834,306 | 5/1989 | Robertson et al. | 242/71.1 |
| 4,846,418 | 6/1989 | Fairman | 242/71.1 |
| 4,930,712 | 6/1990 | Smart | 242/74 |
| 4,938,429 | 7/1990 | Robertson et al. | 242/71.1 |
| 5,031,853 | 7/1991 | Jensen | 242/71.1 |
| 5,031,855 | 7/1991 | Wolf et al. | 242/71.1 |
| 5,153,627 | 10/1992 | Dwyer | 354/217 |

Primary Examiner—Michael L. Gellner
Assistant Examiner—Nicholas J. Tuccillo
Attorney, Agent, or Firm—Sughrue, Mion, Zinn, Macpeak & Seas

[57] ABSTRACT

A photographic film cassette has photographic film wound on a spool and rotatably contained in a cassette shell. A leader of the photographic film is advanced outward from a passage mouth when the spool is rotated in the unwinding direction. The spool has a toothed wheel. A spring plate is provided inside the cassette shell. The spool is stopped by the spring plate from rotating. The spool is allowed to rotate when a torque of at least 50 gf·cm is applied to the spool. While a camera is loaded with the novel cassette, the spring plate is displaced to make the spool free from the toothed wheel to rotate. In another preferred embodiment, the spool is provided with a biased stopper, which is pressed with friction against the inside of the cassette shell. This friction stops the spool from freely rotating.

33 Claims, 10 Drawing Sheets

PHOTOGRAPHIC FILM CASSETTE HAVING A LOCKING SPOOL

BACKGROUND OF THE INVENTION

1. Field of the Invention

The present invention relates to a photographic film cassette wherein rotation of a spool causes a leader of photographic film to advance outward from the cassette, and more particularly to a leader-advancing photographic film cassette which has a locking spool so as to make the handling thereof easier.

2. Description of the Related

A known photographic film cassette includes a photographic filmstrip (hereinafter referred to as film) positioned so that a leader of the photographic film does not protrude from the cassette shell prior to loading the cassette in a camera. Such a cassette is easily loaded into a camera. A simple film advancing mechanism of the camera is typically used with this type of cassette, and includes a construction which rotates a spool of the cassette to unwind the photographic film, thereby causing the leader to move through a passageway for the photographic film and exit from the cassette. Such a device is disclosed in U.S Pat. Nos. 4,846,418 and 4,938,429. Such a cassette is advantageous in that it can be easily handled without the need for touching the photographic film.

The photographic film is somewhat rigid so as to recover a straight form, even after being wound in a roll. In the leader-advancing cassette, mechanical shocks or vibration during transportation etc. cause looseness to develop between the turns of its roll. Excessive loosening of the photographic film sometimes causes the leader to accidentally advance out of the cassette shell through the passage mouth, thereby causing fogging of the film due to exposure to ambient light. To prevent the photographic film from loosening, it is known to lock or stop the spool of the cassette from rotating when it is out of use. The camera suitable for a cassette thus constructed must be adapted to releasing the spool from being locked.

However, when a camera suitable for such a locking cassette is loaded with the cassette, a rotary mechanism incorporated in the camera applies a rotational force to the spool to drive it. If there is a failure to release the spool from the locked state, the locking mechanism of the spool would oppose the motion of the rotary mechanism of the camera. In such a case, the spool, the locking mechanism and the rotary mechanism of the camera may be damaged. Also, in such a case, it would be impossible for the leader-advancing cassette to cause the leader to exit from the cassette.

SUMMARY OF THE INVENTION

In view of the foregoing problems, an object of the present invention is to provide a leader-advancing photographic film cassette in which a photographic film can be both prevented from loosening when out of use, and effectively fed when loaded in the camera.

In order to achieve the above and other objects and advantages of this invention, locking means is provided inside a cassette shell for stopping a spool from rotating, and adapted to allowing the spool to rotate when a rotational torque of at least a predetermined value is applied to the spool. In a preferred embodiment, the locking means has an unlocked state. The spool is free to rotate while in the unlocked state. The locking means is set in the unlocked state by a camera while the cassette is loaded in the camera. Therefore, the leader can be advanced outward, without damage to the spool, the spring plate, or the rotary mechanism of the camera. Accordingly, the photographic film can be both prevented from loosening when out of use, and effectively fed when in use and thus the photographic film will never fog during transportation.

The present invention may be applied to a cassette in which the spool includes first and second spool pieces. The first spool piece includes a first flange, a first core, a first end of the first core supported by the cassette shell, and a second end opposite to the first end. The second spool piece includes a second flange, a second core, a third end of the second core supported by the cassette shell, and a fourth end opposite to said third end and associated with the second end. Displacement allowing means is associated with the second and fourth ends for allowing the spool to change between lengthened and shortened states by relative sliding of the two spool pieces. First and second lateral edges of a roll of the photographic film are tightly clamped between the two flanges when the spool takes the shortened state. A cam mechanism is associated with the second and fourth ends for causing the spool to change from the lengthened state to the shortened state, when the spool is rotated in the film unwinding direction, so as to cause the roll to rotate together with the spool, and advance the leader outward from the cassette shell.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
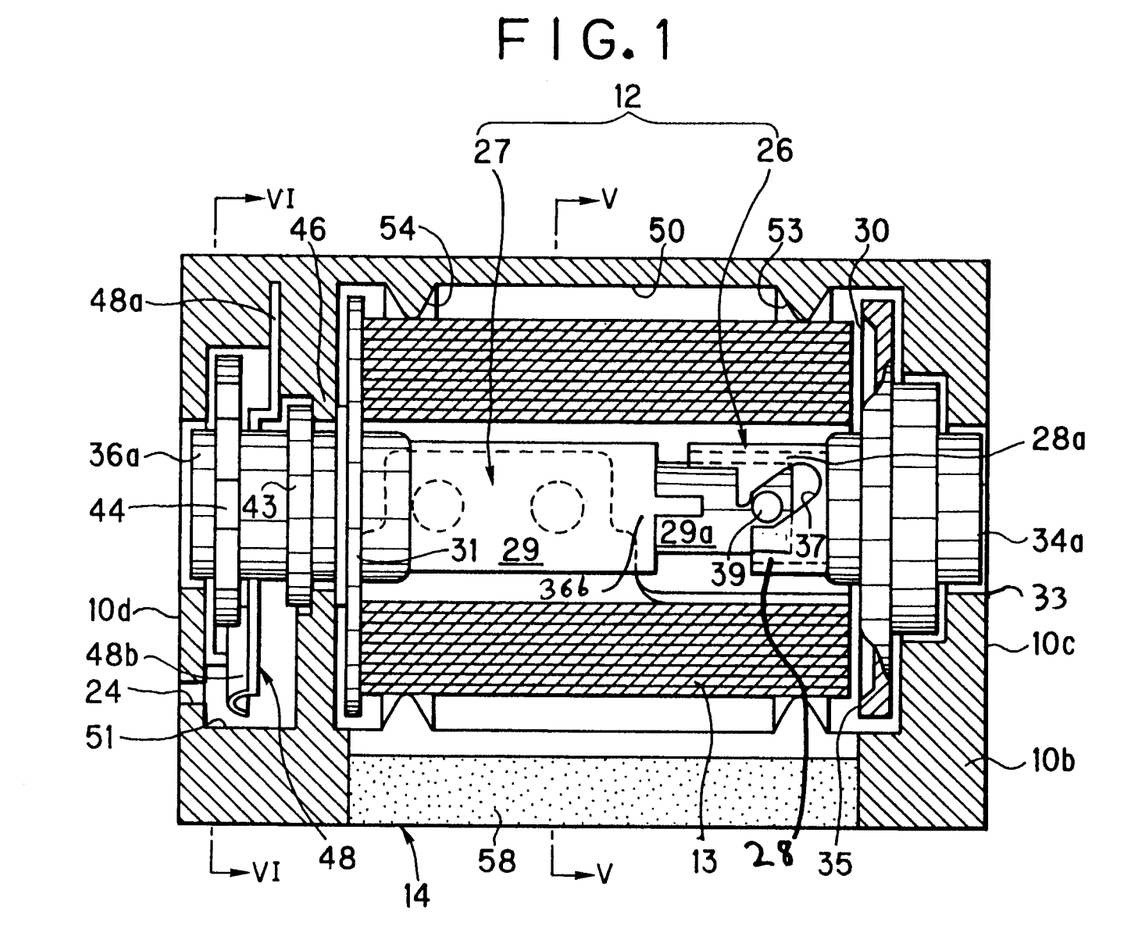
FIG. 1 is a vertical sectional view illustrating a photographic film cassette according to the first embodiment of the present invention.
Figure 2:
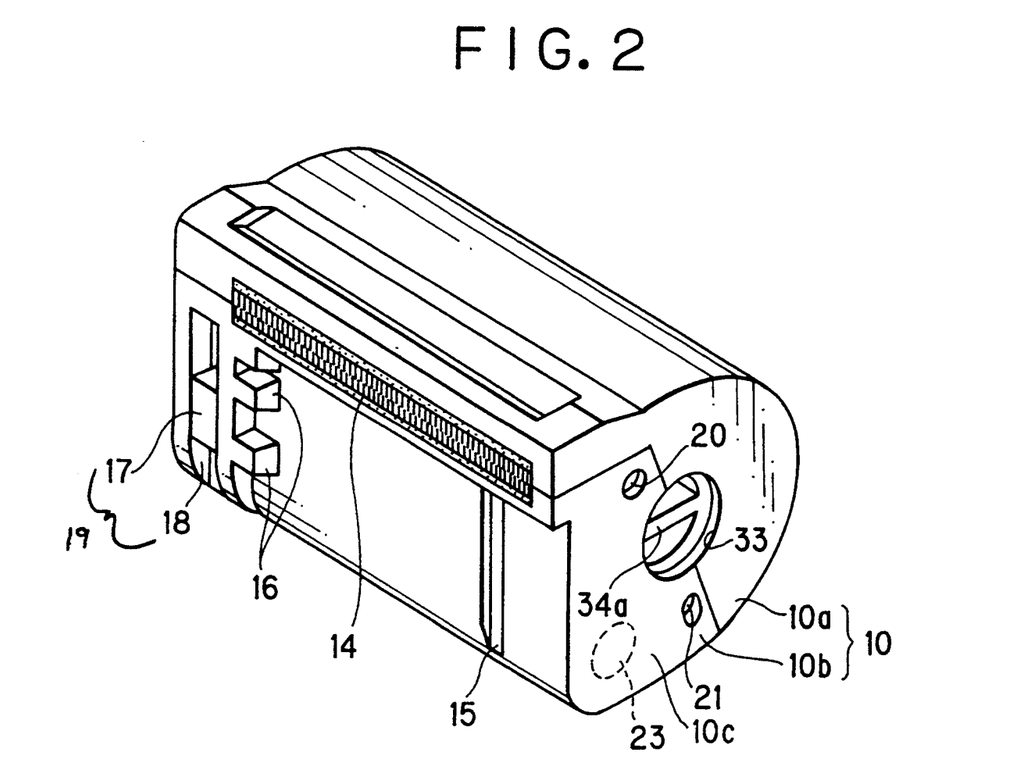
FIG. 2 is a perspective view illustrating the first embodiment.

FIGS. 1 and 2 illustrate a photographic film cassette, of the first embodiment. A cassette shell 10 is constituted of a pair of shell halves 10a and 10b of resin provided with a light-shielding characteristic, and welded together by ultrasonic welding. When a spool 12 is rotated, a leader 13b of a photographic film 13 is caused to advance outward from the cassette shell 10 through a passage mouth 14.

A dropping-preventing groove 15, adapted for engagement with a pin of a camera 80 (see FIG. 11) for preventing the cassette shell 10 from dropping inadvertently out of a cassette receiving chamber, is formed in a circumferential surface of the shell half 10b. A DX code pattern 16 and a use-condition signaling structure 19 are disposed on the circumferential surface on the side close to an end face 10d of the cassette shell 10. The DX code pattern 16 is adapted to transmitting information to the camera 80, such as sensitivity, maximum frame number, and latitude of the photographic film. The pattern 16 is unlike a conventional structure as constituted of metallic conductive portions and insulated portions to be detected electrically, and includes portions which are flush with a surface of passage mouth 14 and recesses for defining the portions therebetween. This information is detected by sensing the patterned shape with a sensing device in the camera 80.

Figure 3:
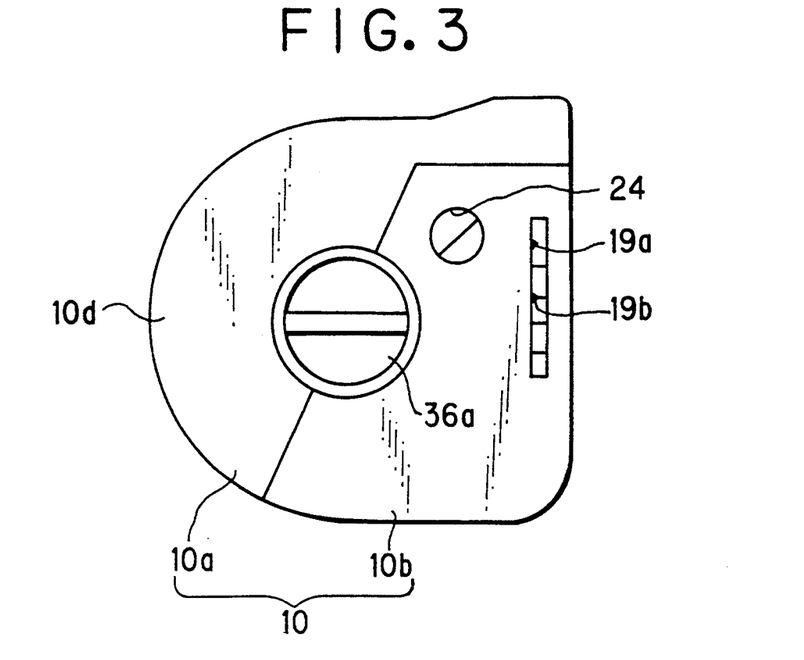
FIG. 3 is a left side view illustrating the first embodiment.

The use-condition signaling structure 19 is constituted of a groove 18 and a signaling slider 17 slidably fitted therein to represent a condition of exposure of the photographic film 13 according to the position of slide 17 along the groove 18. The slider 17 is shifted from the unexposed position to the exposed position by a shifter of the camera 80. In the bottom of the groove 18 are formed projections 19a and 19b respectively for stopping the slider 17 by virtue of engagement therewith, as illustrated in FIG. 3.

Two positioning holes 20 and 21 are formed in the lower shell half 10b on the side of an end face 10c which is opposite to the end face 10d. The hole 20 is circular, while the hole 21 is of an elliptical shape. The holes 20 and 21 are adapted to receiving respective positioning pins of the camera 80 to define the radial direction of the cassette shell 10 or, in other words, the direction in which the passage mouth 14 is directed within the camera 80. The end face 10c has a portion 23, as indicated in FIG. 2, which is adapted to contact with a contact member (not illustrated) in the camera 80 for positioning the cassette shell 10 axially in the camera 80. The shell end face 10d is provided, as illustrated in FIG. 3, with a through hole 24 for receiving an unlocking pin on a bottom door of the camera 80, in order to release the spool from a locked state in the manner described below.

The rotatable spool 12 is constituted of a pair of spool pieces 26 and 27 connected together in a coaxial manner. The first spool piece 26 has a core 28 and a flange 30. An end 34a of the first spool piece 26 is exposed externally through a bearing hole 33 and is adapted to engagement with a drive shaft 83 of the camera 80 (see FIG. 11). The flange 30 is provided with a circumferential lip 35 formed along its peripheral edge. The lip 35 has an inclined contact surface which contacts with one side 13c of the outermost turn of a roll of the photographic film 13 (see FIG. 8), and prevents the roll from loosening. The second spool piece 27 has a core 29 and a flat flange 31. A shaft 29a is formed on an end 36b of the second core 29 and has a diameter smaller than the second core 29. The shaft 29a is adapted to insertion in a sleeve 28a.

Figure 4:
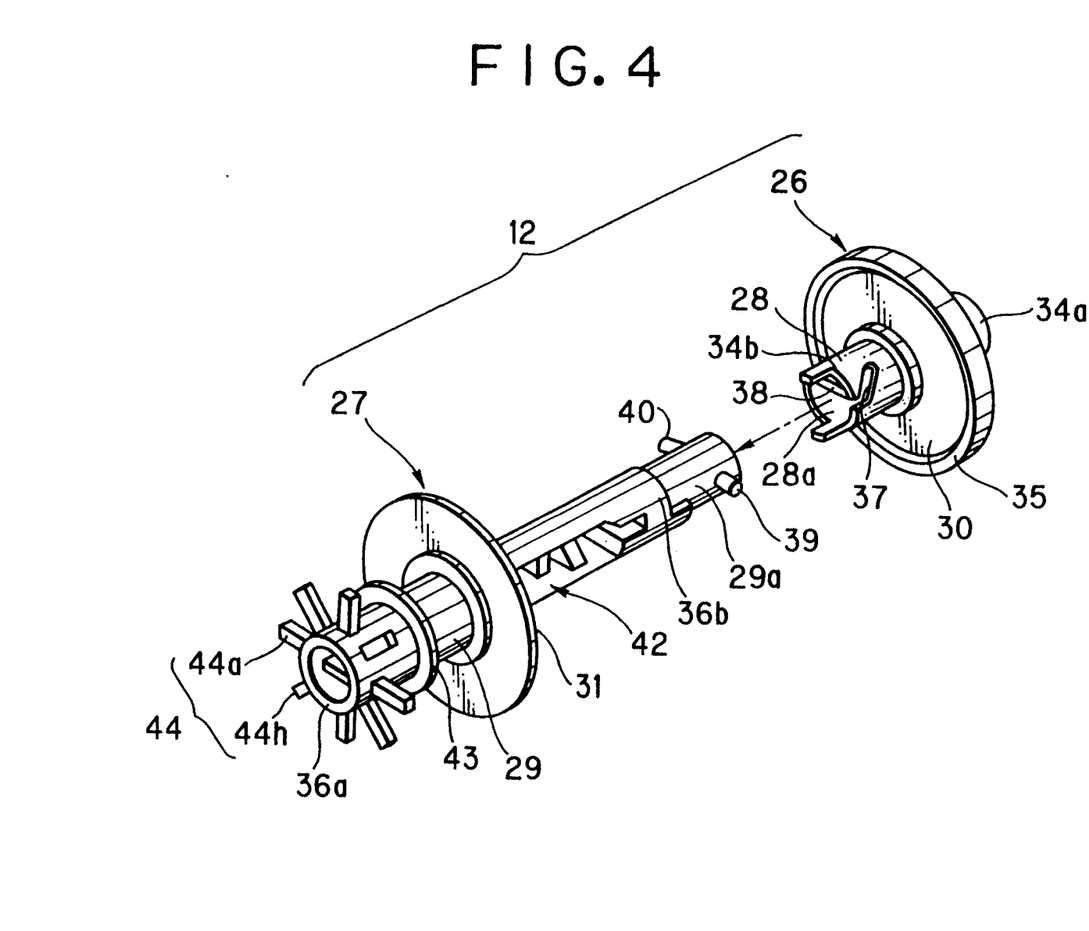
FIG. 4 is an exploded perspective view illustrating a spool of the first embodiment.

A pair of cam followers 39 and 40 are formed on the shaft 29a so as to be engaged with a pair of cam grooves 37 and 38 formed in an end 34b of the sleeve 28a (see FIG. 4). The cam grooves 37 and 38 are adapted to movement with respect to the cam followers 39 and 40, moving spool pieces 26 and 27 closer together when the spool piece 26 rotates in the film unwinding direction, and further apart when the spool piece 26 rotates in the film rewinding direction.

A slot is formed in the second core 29 for receiving a trailer 13a of the photographic film 13. A trailer anchoring structure 42 having claws is formed in this slot. The claws are engaged with holes formed in the trailer 13a so as to anchor the photographic film 13 to the second core 29. A ring portion 43 and a toothed wheel 44 are formed on the second core 29 close to a core end 36a, both in positions outward from the flange 31. The ring portion 43 is supported by a support partition 46 (see FIG. 1) inside the cassette shell 10 which keeps the second spool piece 27 from shifting axially. The toothed wheel 44 is constituted of teeth 44a to 44h, or projections in the shape of a prism, or the like, projected radially from the second core 29, and adapted to stopping rotation of the spool 12 in cooperation with a spring plate 48 which will be described below.

Figure 5:
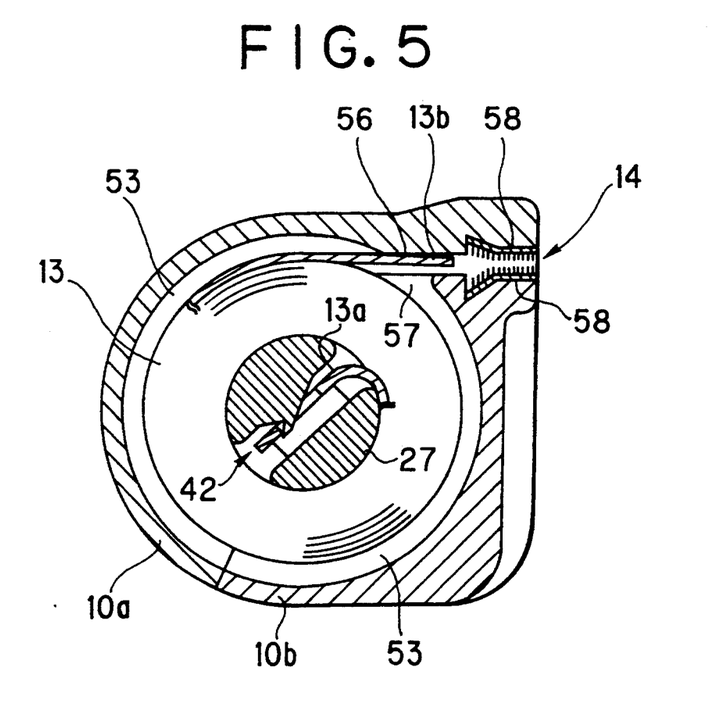
FIG. 5 is a cross sectional view illustrating the first embodiment along line V—V in FIG. 1.

The support partition 46 splits the inside of the cassette shell 10 into a roll chamber 50 and a locking chamber 51. Referring to FIGS. 1 and 5, a pair of annular ridges 53 and 54 are formed on the cylindrical inside surface of the cassette shell 10 so as to be in contact with the outermost turn of the roll of the photographic film 13, and prevent the roll from loosening. A separator claw 57 is formed on the lower shell half 10b and on an end of the ridge 53. The separator claw 57 abuts on a leading end of the leader 13b, separates it from the inner roll, and guides it to a passageway 56 communicating to the passage mouth 14. A pair of light-trapping ribbons, 58, known as plush in the field of photography, are disposed in the passage mouth 14 in order to prevent light from entering the roll chamber 50 through the passage mouth 14.

Figure 6:
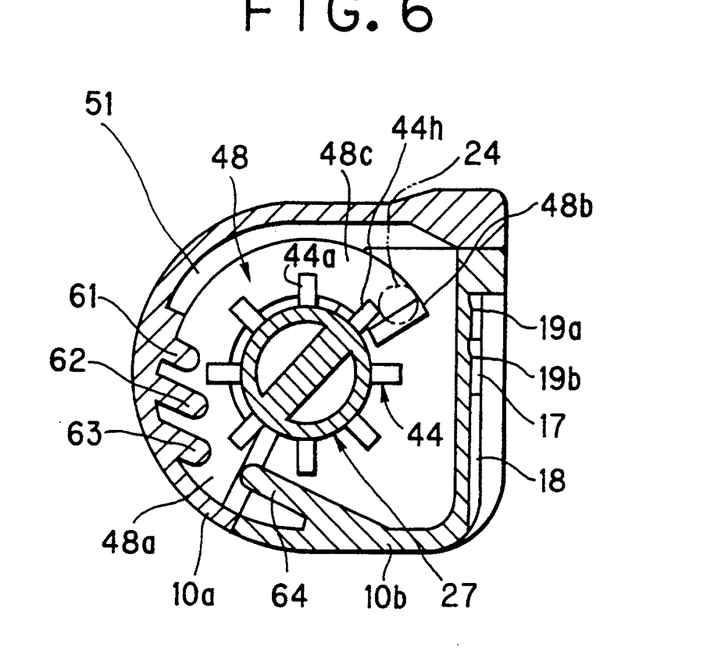
FIG. 6 is a cross sectional view illustrating the first embodiment along line VI—VI in FIG. 1.
Figure 7:
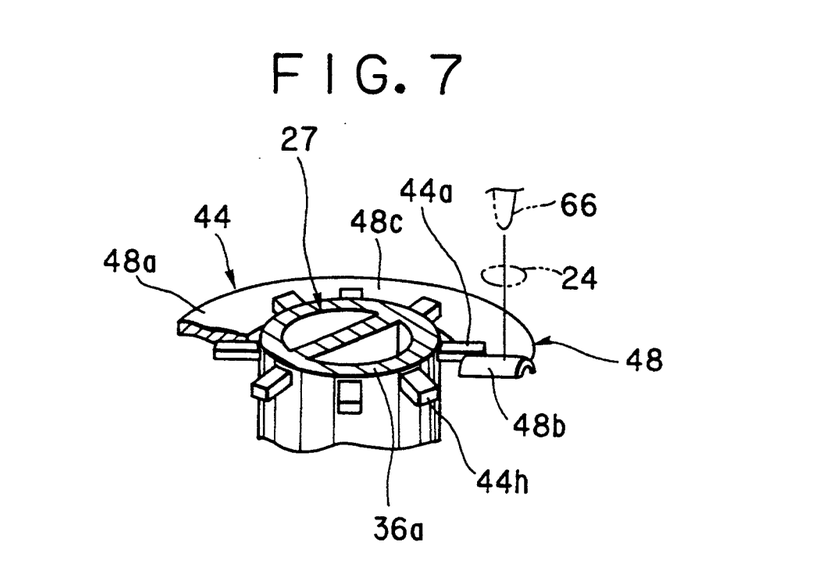
FIG. 7 is a perspective view partly illustrating a locking spring plate and a toothed wheel as illustrated in FIG. 6.

The toothed wheel 44 of the second spool piece 27 is disposed in the locking chamber 51, as illustrated in FIGS. 1, 6 and 7. Behind it, the spring plate 48, serving as a spool locking mechanism, is contained in the locking chamber 51. The spring plate 48 has an arcuate shape and is formed of metal, resin or the like so as to be resilient. A proximal end 48a of the spring 48 is fixed on the upper shell half 10a, whereas an extended portion 48c thereof is free. The extended portion 48c extends toward a position which is opposite the hole 24, and has a stopper 48b formed on its distal by bending the distal end in an arcuate shape. Inside the upper shell half 10a are formed projections 61, 62 and 63. The spring proximal end 48a is fitted on the upper shell half 10a between the projections 61 to 63 and a portion integral with the partition 46 (see FIG. 1). A projection 64 is formed inside the lower shell half 10b in the spool locking chamber 51 so as to abut on the proximal end 48a in order to prevent the proximal end 48a from becoming disengaged from the projections 61 to 63.

The stopper 48b of the spring 48 is inserted between the teeth of the toothed wheel 44. The surface of the stopper 48b, which has an arcuate shape, abuts on, and is engaged with, one of the teeth 44a to 44h of the toothed wheel 44, so as to stop the spool 12 from freely rotating.

The spring plate 48 may alternatively be formed from a curved wire of metal. During assembly of the cassette, it is desirable to apply a horn of an ultrasonic welding apparatus to the lower shell half 10b as opposed to the upper shell half 10a, so as to avoid deforming the projections 61 to 63 of the upper shell half 10a. However, projections for holding the spring plate 48 may be formed solely on the lower shell half 10b, to which the horn of the ultrasonic welding apparatus may be applied.

The stopper 48b of the spring plate 48 is at a position opposite the hole 24. When the camera 80 is loaded with the novel cassette, the stopper 48b is pressed, at a position which is outside of the local of travel of the teeth 44a to 44h, by an unlocking pin 66 which is associated with the cassette 80 and inserted through the hole 24. When the stopper 48b is pressed, the teeth 44a to 44h are released from engagement with the stopper 48b, to allow the spool 12 to freely rotate.

It is important to note that the toothed wheel 44 can be forcibly rotated even while engaged with the stopper 48b, because the spring plate 48 will resiliently move when spool 12 is rotated with torque of at least 50 gf·cm, for example. This is so because the rounded surface of stopper 48b will tend to ride along the teeth 44a to 44h when such a torque is applied. Also, stopper 48b could be fixed, to a rigid member and teeth 44a to 44h could be resilient so as to achieve the same effect.

Experiments were conducted with the cassette of the first embodiment, which was subjected to vibration and precipitation. The vibration was generated for 60 minutes at a force of 1 g (acceleration of gravity), while varying the vibrating frequency from 5 to 100 Hz every 1 minute. For precipitation, the cassette was caused to fall 5 times from a height of 2m down to a concrete surface. As a result, the spool 12 of the cassette was never rotated even after vibration and precipitation. These experiments confirmed that the spool 12 of the preferred embodiment can be prevented from rotation, with respect to the cassette shell, during transportation or in handling by a photographer.

Figure 8:
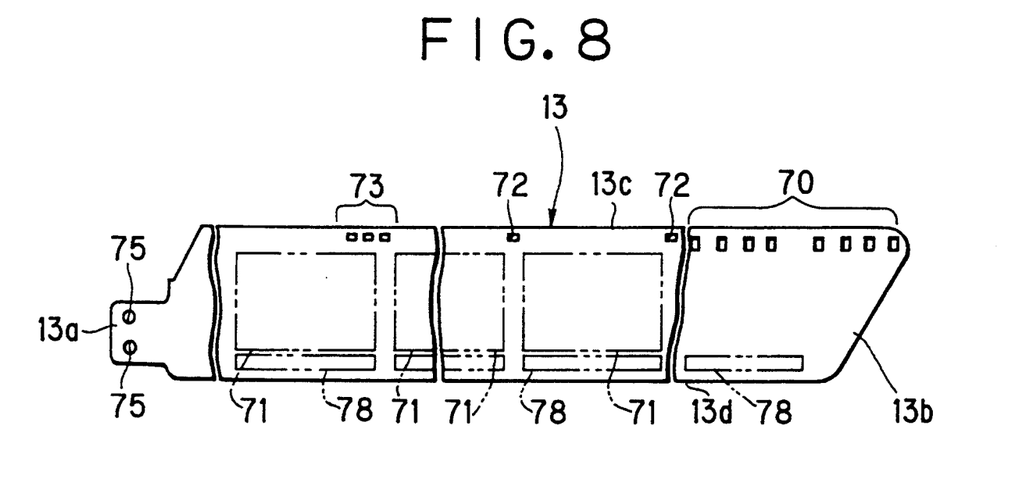
FIG. 8 is a plan view illustrating a photographic film.

The leader 13b, as illustrated in FIG. 8, is shaped slantwise so as to project at a side thereof corresponding with the separator claw 57. Several take-up perforations 70 are formed along a lateral edge 13c of the photographic film 13 in the leader 13b, so as to be engaged with claws of a take-up spool of the camera 80. Metering perforations 72, to be detected for positioning the photographic film 13 at a pitch equal to that of picture frames 71 to be recorded on the photographic film 13, are formed along lateral edge 13c. Beside a position for the final picture frame, three perforations 73 are formed for allowing detection of the termination of exposing the photographic film 13 by the camera 80. The perforations 70, 72 and 73 are arranged along the lateral edge 13c, on the side of which the first spool piece 26 is to be driven by the camera 80 via the engagement between the end 34a and the drive shaft 83 (see FIG. 11).

Figure 9:
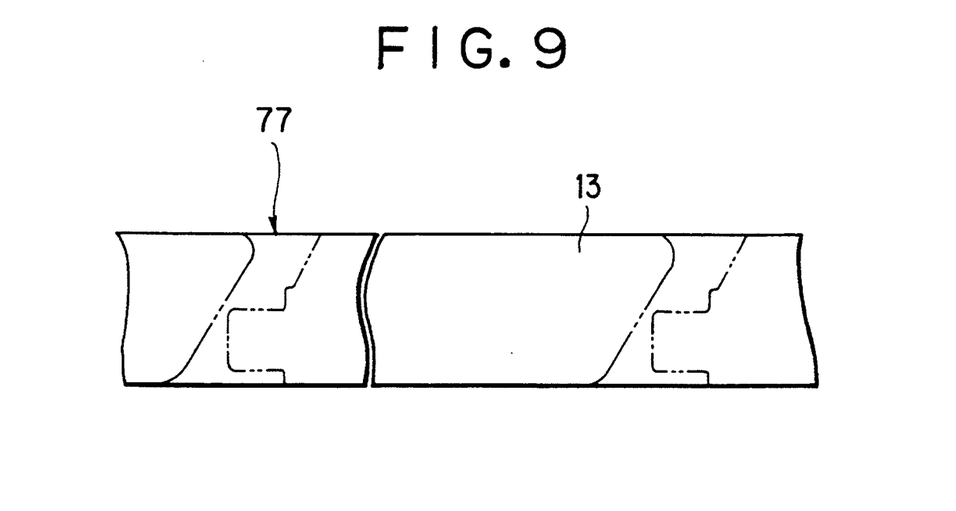
FIG. 9 is an explanatory view illustrating a manner of cutting the photographic film strip out of continuous photographic film.

The trailer 13a projects from a side of a lateral edge 13d opposite to the lateral edge 13c from which the leading end projects with a slant. Two holes 75 are formed in the trailer 13a so as to allow the trailer 13a to be anchored on the anchoring structure 42. The above-mentioned relationship between the leader 13b and the trailer 13a, as projected diagonally with each other, lowers the cost of manufacturing the photographic film 13, because only a small portion between each strip of the photographic film 13 is abandoned after cutting continuous photographic film 77 into the strips, as illustrated in FIG. 9. The back surface of the photographic film 13 is provided with a transparent magnetic recording layer coating over all or part of the back surface. The areas outside the picture frames 71 are adapted to being used as a magnetic recording track 78, on which a magnetic head of the camera 80 records information magnetically.

The operation of the novel cassette will now be described. The slider 17 of the use-condition signaling structure 19 is originally engaged with the projection 19b to indicate the unexposed state of the photographic film 13. The spool 12 is locked by engagement of the toothed wheel 44 with the stopper 48b at this time, so that the photographic film 13 is prevented from loosening and the leader 13b is prevented from exiting to the outside of the cassette shell 10.

Figure 11:
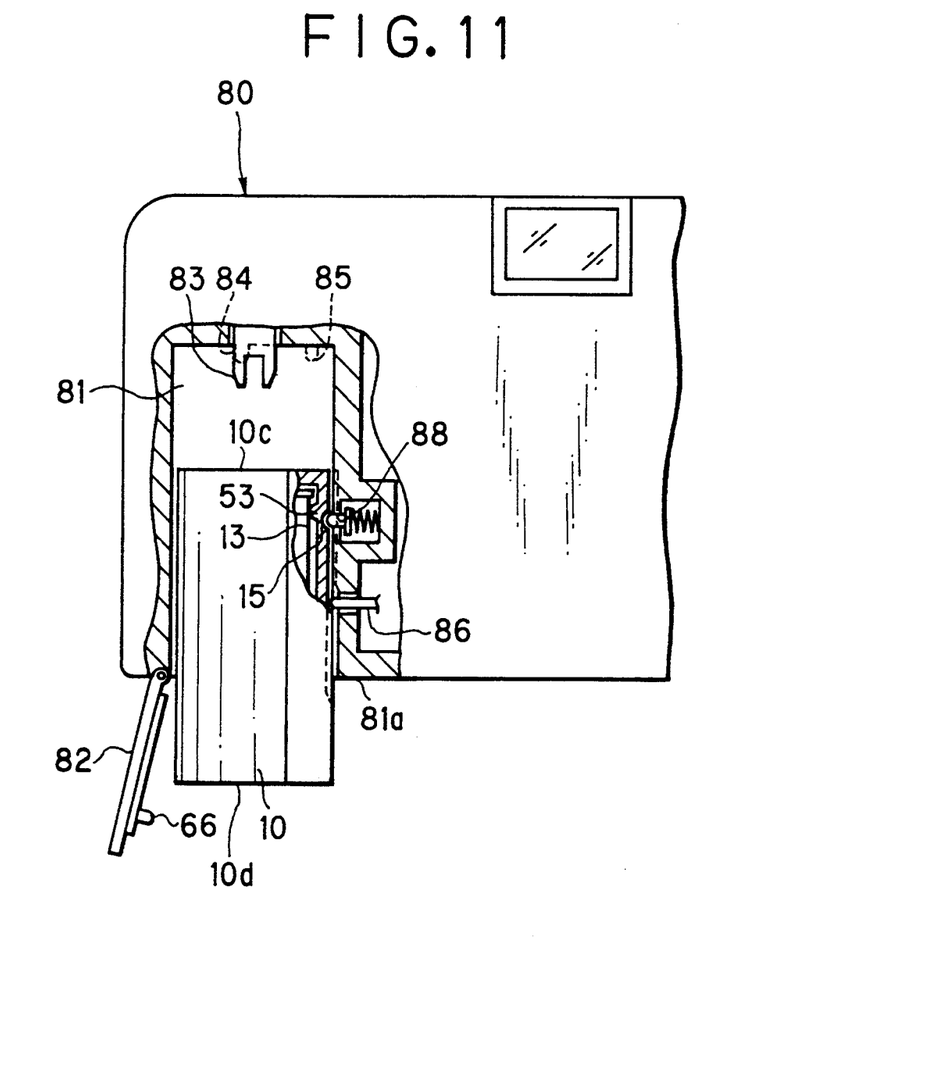
FIG. 11 is an explanatory view illustrating a state where the cassette is removed from the camera.

The camera 80 for loading the novel cassette, as illustrated in FIG. 11, is provided with a cassette chamber 81, on the left side as viewed from a photographer holding the camera 80. To load the cassette, a bottom door 82 is swung down to open the cassette chamber 81. The end 34a of the first spool piece 26 is directed into a bottom opening 81a to insert the cassette shell 10 in the axial direction.

Projections 84 and 85, formed inside the cassette chamber 81 are fitted in the holes 20 and 21 respectively, and the area 23 is received on the contact member (not illustrated) formed in the camera 80. A drive shaft 83, or a fork having curved tips, is engaged with the core end 34a. The cassette shell 10 is inserted so that the passage mouth 14 is directed appropriately to the exposure aperture. A pin 86, associated with a sensing device (not shown) in the camera 80, is engaged with the DX code pattern 16 so that the camera 80 reads the information relating to the photographic film 13.

To engage the drive shaft 83 with the core end 34a, conventional cameras have necessitated a mechanism which incorporates a spring for allowing retraction of such a drive shaft during abutment between it and the core end in order to avoid failure in engagement. However, the camera 80 for use with the invention does not require such a retraction mechanism for the drive shaft 83. This is because, even when the core end 34a abuts on the drive shaft 83 without engagement, the cassette shell 10 can be manually forced into the cassette chamber 81. The curvature of the tips of the drive shaft 83 in forced abutment imports a rotational torque to the spool 12. When the rotational torque of the spool 12 increases up to 50 gf·cm, the spool 12 is forced to rotate up to 90 degrees so as to be properly engaged with the drive shaft 83. As a result, the novel cassette can reduce a cost of manufacturing the camera suitable therefor by rendering the structure of the drive shaft 83 less complicated and less expensive.

The bottom door 82 is then swung up to close the cassette chamber 81 in a light-tight fashion. The pin 66 on the door 82 is received in the hole 24 in the cassette shell 10, and presses the stopper 48b. The second spool piece 27 is prevented, by the ring portion 43, from being slid axially relative to the cassette shell 10. This is an advantageous construction in that the pin 66 can have a relatively small length and thus the camera 80 can be compact size. Also, the rigidity of the pin 66 is improved by the small length. Note that the pin 66 is depicted in FIG. 10 to be relatively long only for the purpose of clarity.

Insertion of the pin 66 moves and disengages the stopper 48b from the toothed wheel 44 to allow the spool 12 to freely rotate. Upon closing the door 82, the slider 17 is moved by the camera 80 to bring the slider 17 into engagement with the projection 19a. The drive shaft 83 is then driven so as to rotate the spool 12 in the direction for unwinding the photographic film 13 and cause the leader 13b to advance outside of the cassette.

Figure 10:
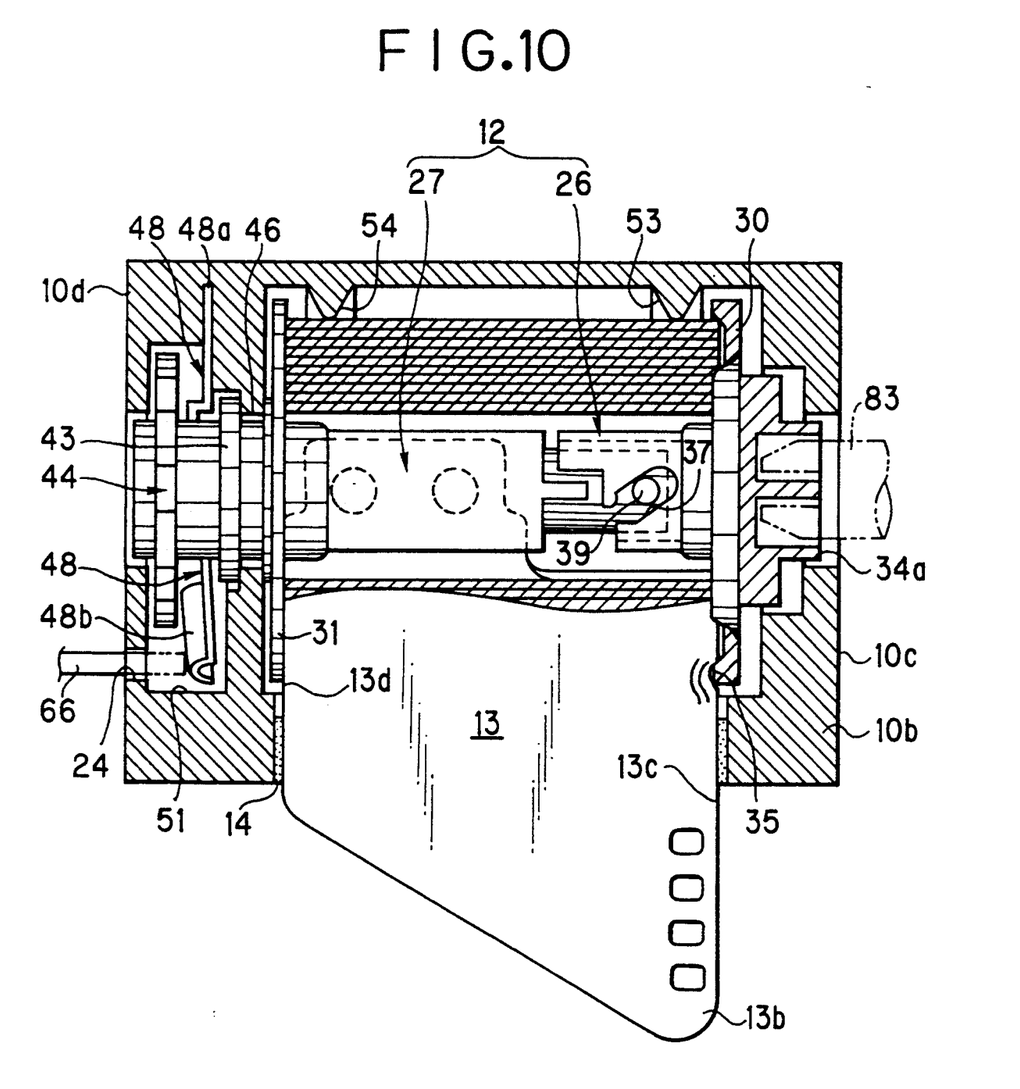
FIG. 10 is a vertical sectional view illustrating a state where a leader of the photographic film is advanced out of the cassette.

When the spool 12 is rotated in the film unwinding direction, the first spool piece 26 is moved toward the second spool piece 27, as the second spool piece 27 is fixed in the axial direction, by the interaction of the cam followers 39 and 40 and the cam grooves 37 and 38, as illustrated in FIG. 10. The photographic film 13 is thus clamped between the flanges 30 and 31 is rotated together with the spool 12. During this rotation, the leader 13b is separated by the separator claw 57, directed to the passageway 56, and exited out of the passage mouth 14, and fed toward the exposure aperture of the camera 80.

After the leader 13b is passed behind the exposure aperture of the camera 80, the take-up perforations 70, formed in the leader 13b, are caught by claws on the take-up spool in a takeup chamber (not illustrated) of the camera 80. Then the drive shaft 83 is allowed to freely rotate while the take-up spool is driven to feed and wind up the photographic film 13. When the initial metering perforation 72 is detected, the photographic film 13 is stopped to position the first picture frame 71 on the exposure aperture. After the exposure of the first picture frame 71, the photographic film 13 is fed until the detection of the second metering perforation 72, and so on. During this feeding, information regarding the exposure is recorded on to the magnetic recording track 78. After each exposure, the feeding, magnetic recording, the detection of the metering perforation 72 are repeated. After the final one of the picture frames 71 is exposed, the perforations 73 are detected.

Magnetic recording in the camera 80, in general, requires a mechanism for precisely positioning the magnetic recording track 78 on the photographic film 13 relative to the magnetic recording head in the camera 80. The photographic film 13 of the novel cassette has the trailer 13a anchored on the second core 29 which is supported so as to be fixed axially, with respect to the cassette shell. Such a design is effective in preventing the magnetic recording track 78 of the photographic film 13 from deviation relative to the magnetic head.

In the preferred embodiments, the photographic film 13 is provided with the perforations 72 and 73 arranged along the lateral edge 13c and the magnetic recording track 78 formed along the edge 13d which is opposite to the lateral edge 13c. Accordingly, the camera 80 suitable for the cassette of the first embodiment has a construction wherein a magnetic recording/reproducing device is disposed vertically opposite from a perforation detector device, as viewed from the exposure aperture. Therefore, no extra complicated structure is required for juxtaposing the recorder device and the detector device, and thus the camera can be designed in a compact configuration.

Upon detecting the final perforations 73, the camera 80 causes the drive shaft 83 to rotate to drive the spool 12 in the direction for rewinding the photographic film 13. The cam followers 39 and 40 and the cam grooves 37 and 38 now cause the first spool piece 26 to slide in the spool lengthening direction away from the second spool piece 27. The photographic film 13 is thus released from the clamp of the flanges 30 and 31. The photographic film 13 is rewound up around the spool 12. When the photographic film 13 is fully contained in the cassette shell 10, the camera 80 generates a rewinding completion signal so as to stop the drive shaft 83 from rotating.

After finishing rewinding the photographic film 13, the bottom door 82 is opened as illustrated in FIG. 11. The unlocking pin 66 is removed from the hole 24, as the cassette drops out of the chamber 81, to allow engagement of the stopper 48b with the toothed wheel 44. Free rotation of the spool 12 is thus stopped again.

When the bottom opening 81a is directed downward with the door 82 open, the core end 34a and the holes 20 and 21 are disengaged or left free from the drive shaft 83 and the pins 84 and 85 respectively. The cassette shell 10, which would otherwise fall out of the chamber 81, is stopped from falling by engagement between the groove 15 with the preventive pin 88. In this state, the lower portion of the cassette shell projects from the bottom opening 81a. The cassette can then be easily removed from the camera 80 by the photographer.

Note that the slider 17, which has been moved by a device in the camera 80, is maintained in the exposed position through engagement with the projection 19a. The slider 17 thus positively indicates the exposed state of the photographic film 13, so that the used cassette cannot be inadvertently reused.

Should the unlocking pin 66 be broken, the stopper 48b will not be shifted to the unlocked state from the toothed wheel 44. However, the drive shaft 83 of the camera 80 is designed to be capable of generating a torque of at least 50 gf·cm, so that deformation of the spring plate 48 allows the teeth 44a to 44h to pass along the stopper 48b. The leader 13b of the photographic film 13, therefore, can be advanced without damage to the spool 12, the spring plate 48 or the rotary mechanism of the camera 80 even if the unlocking apparatus of the camera is ineffective.

Figure 12:
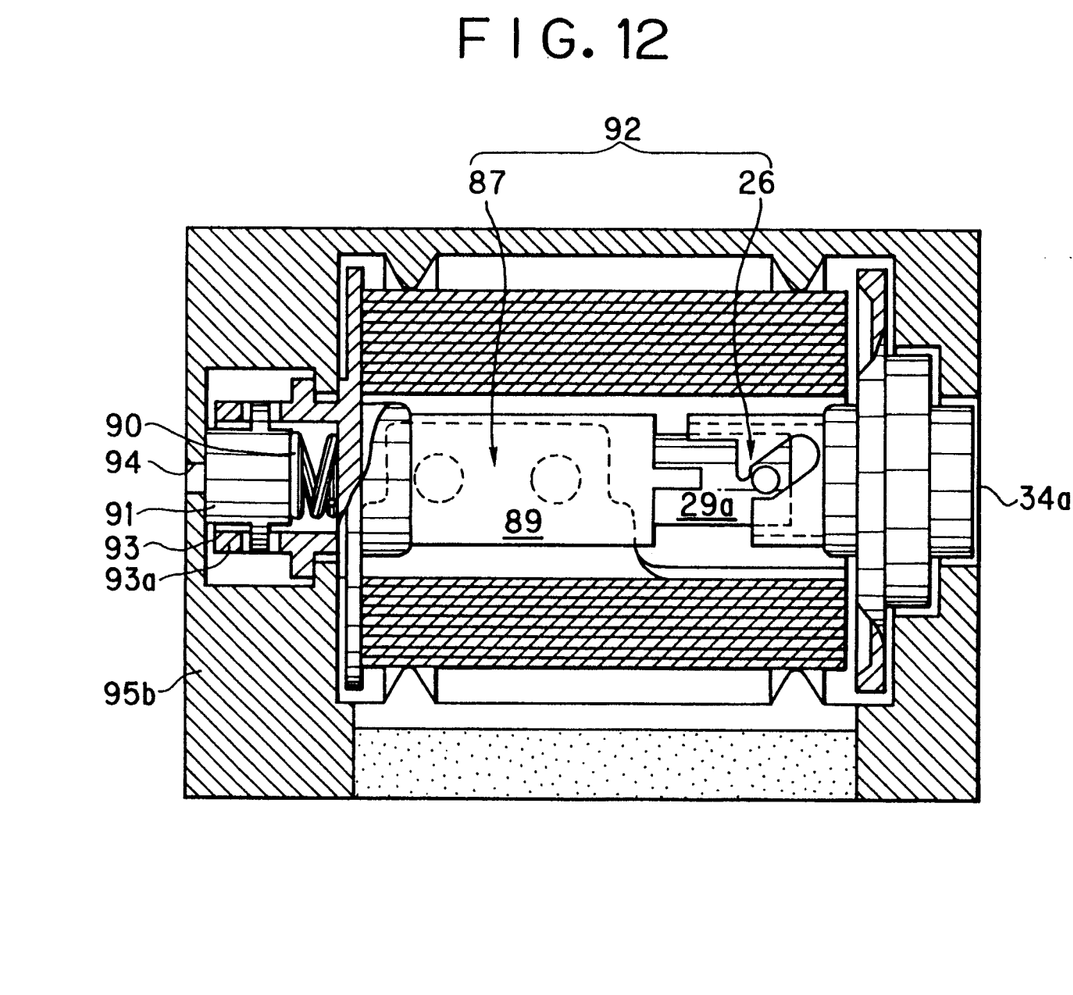
FIG. 12 is a vertical sectional view illustrating the second preferred novel cassette.
Figure 13:
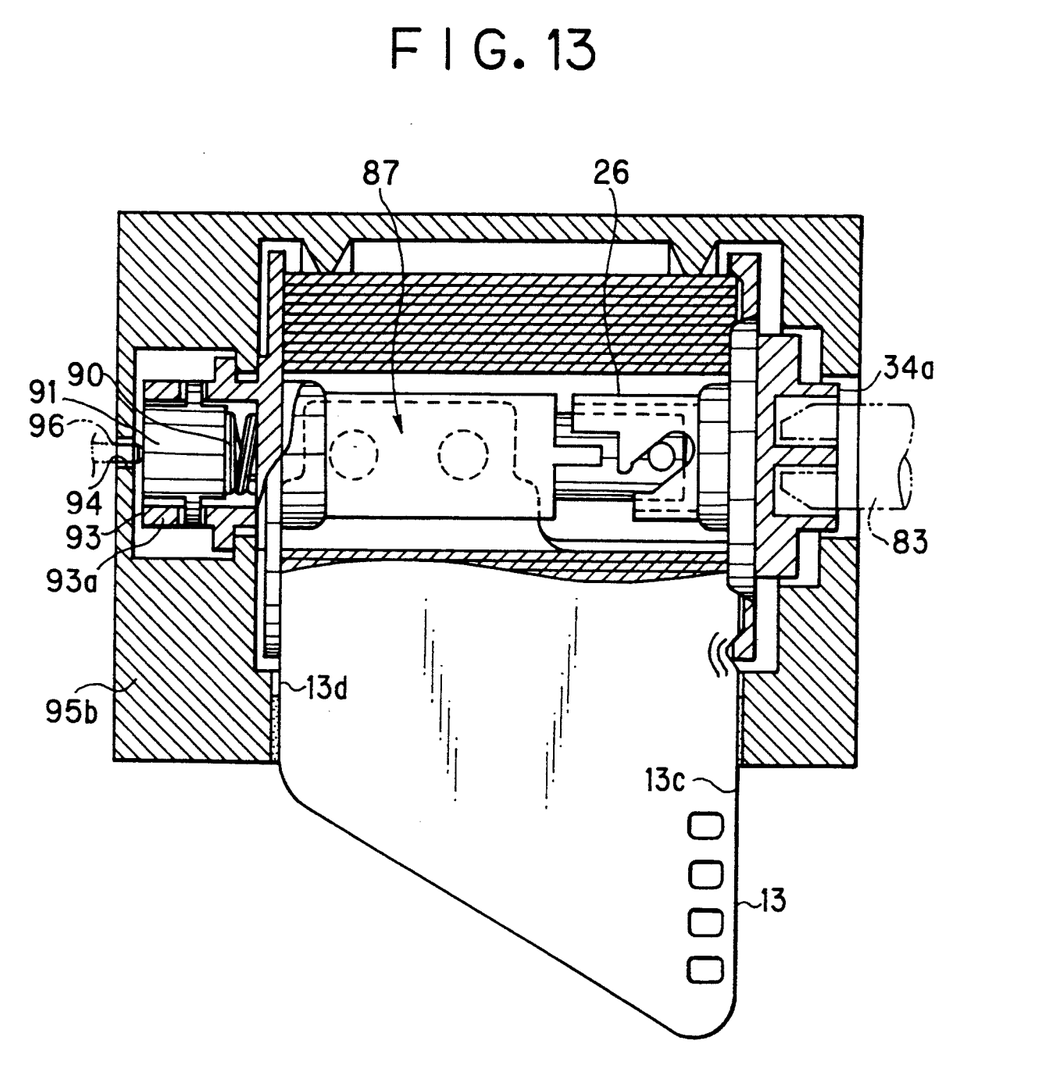
FIG. 13 is a vertical sectional view illustrating a state where a leader of the photographic film is advanced out of the cassette illustrated in FIG. 12.

FIG. 12 illustrates a second preferred embodiment of the invention. A second spool piece 87, having a core 89, which is provided with a sleeve 93a on a core end 93, is combined with the first spool piece 26. A stopper 91 is disposed within the sleeve 93a, and biased by a coiled spring 90 toward a lateral inner wall inside an end face of a cassette shell. Only a lower shell half 95b of the cassette shell is shown in the drawings. Free rotation of a spool 92 is prevented by frictional contact between the stopper 91 and the cassette shell. The strength of the spring 90 is predetermined such that the spool 92 is allowed to rotate is applied thereto when a torque of 50 gf·cm (or any other suitable torque) or more is applied thereto. As illustrated in FIG. 13, a camera suitable for the cassette of the second embodiment is provided with an unlocking pin 96 projected from a bottom door and adapted to being inserted in a through hole 94. The pin 96, inserted into the hole 94, presses the stopper 91 against the spring 90 to retract it axially. The spool 92 is thus released from the frictional contact between the stopper 91 and the lateral inner wall of the cassette shell 95, and allowed to freely rotate in response to the operation of loading the camera with the cassette. Note that the coiled spring 90 may be replaced with a sponge or other resilient member.

The plush 58 of the preferred embodiments may be replaced by sponge, or the like, for preventing light from entering the passage mouth 14.

Although the roll of the photographic film 13 is prevented from loosening by the arcuate ridges 53 or 54 in the embodiments, the cassette shell may also have a structure for transmitting rotation of the roll, as disclosed in U.S. Pat. No. 4,834,306, wherein circumferential lips are formed around both flanges for being in contact with lateral edges of outer turns of the roll, and spreader projections are formed proximate the passageway of the photographic film for releasing the outer turns from the circumferential lips.

The cassette may also have a structure as suggested in Japanese Patent Laid-open Publication No. 3-37645 (corresponding to U.S. Ser. No. 07/870,212 and EP 0 406 815 A2), wherein that projections are formed on the inside of end faces of the cassette shell for pressing the spool flanges against end faces of the roll of the photographic film so as to cause the flanges to clamp outer turns of the roll.

In fact, any structure known in the art for this purpose can be used for the film cassette of the invention to advance the leader of the photographic film outward from the cassette shell upon rotation of the spool.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A photographic film cassette in which photographic film is wound on a spool rotatably contained in a cassette shell, and in which a leader of said photographic film is advanced outward from a passage mouth when said spool is rotated, said cassette comprising:
   locking means provided inside said cassette shell for stopping rotation of said spool when a rotational torque of less than a predetermined value is applied to said spool and for allowing said spool to rotate when a rotational torque of at least said predetermined value is applied to said spool, said locking means comprising a sleeve formed on an end of said spool, a stopper member slidably contained within said sleeve and adapted to coming in contact with an inner lateral wall of said cassette shell and a biasing member disposed within said sleeve so as to bias said stopper member into contact with said inner lateral wall, said spool rotating against friction between said stopper member and said inner lateral wall when a torque of at least said predetermined value is applied thereto.

2. A photographic film cassette in which photographic film is wound on a spool rotatably contained in a cassette shell, and in which a leader of said photographic film is advanced outward from a passage mouth when said spool is rotated, said cassette comprising:
   locking means provided inside said cassette shell for stopping rotation of said spool when a rotational torque of less than a predetermined value is applied to said spool and for allowing said spool to rotate when a rotational torque of at least said predetermined value is applied to said spool, said locking means comprising a toothed wheel formed proximate an end of said spool and contained in said cassette shell and a spring member disposed in said cassette shell so as to be biased into engagement with said toothed wheel, said spring member comprising a proximal portion fixed to said cassette shell, a resilient extended portion extending from said proximal portion and a stopper projection formed on a distal end of said extended portion so as to extend into a spatial domain defined by passage of teeth of said toothed wheel, said teeth passing along a surface of said stopper projection when a torque of at least said predetermined value is applied to said spool whereby said toothed wheel is allowed to rotate.

3. A photographic film cassette as claimed in claim 2 wherein said surface of said stopper is arcuate.

4. A photographic film cassette in which photographic film is wound on a spool rotatably contained in a cassette shell, and in which a leader of said photographic film is advanced outward from a passage mouth when said spool is rotated, said cassette comprising:
   locking means provided inside said cassette shell for stopping rotation of said spool when a rotational torque of less than a predetermined value is applied to said spool and for allowing said spool to rotate when a rotational torque of at least said predetermined value is applied to said spool, said locking means being set in an unlocked state, in which said spool can freely rotate, in response to closing a door of a cassette chamber of a camera which is loaded with said cassette shell.

5. A photographic film cassette in which photographic film is wound on a spool rotatably contained in a cassette shell, and in which a leader of said photographic film is advanced outward from a passage mouth when said spool is rotated, said cassette comprising:
   locking means provided inside said cassette shell for stopping rotation of said spool when a rotational torque of less than a predetermined value is applied to said spool and for allowing said spool to rotate when a rotational torque of at least said predetermined value is applied to said spool; and
   wherein and end face of said cassette shell has a through hole formed therein proximate said locking means, said through hole receiving an unlocking pin formed on the camera so as to set said locking means to an unlocked state.

6. A photographic film cassette as claimed in claim 5 wherein said locking means is associated with said spool and said unlocking pin projects form a door of the camera.

7. A photographic film cassette in which photographic film is wound on a spool rotatably contained in a cassette shell, and in which a leader of said photographic film is advanced outward from a passage mouth when said spool is rotated, said cassette comprising;
   locking means provided inside said cassette shell for stopping rotation of said spool when a rotational torque of less than a predetermined value is applied to said spool and for allowing said spool to rotate when a rotational torque of at least said predetermined value is applied to said spool, said locking means being set in an unlocked state, in which said spool can freely rotate, when said cassette is loaded in said camera, said locking means comprising:
   a sleeve formed on an end of said spool;
   a stopper member slidably contained within said sleeve and adapted to coming in contact with an inner lateral wall of said cassette shell; and a biasing member disposed within said sleeve so as to bias said stopper member into contact with said inner lateral wall, said spool rotating against friction between said stopper member and said inner lateral wall when a torque of at least said predetermined value is applied thereto.

8. A photographic film cassette as claimed in claim 7, said spool comprising;

first and second spool pieces;

said first spool piece including as first flange, a first core, a first end of said first core, which is supported by said cassette shell, and a second end which is opposite to said first end;

said second spool piece including a second flange, a second core, a third end of said second core, which is supported by said cassette shell, and a fourth end which is opposite to said third end, said fourth end being associated with said second end;

displacement allowing means associated with said second and fourth ends for allowing said spool to change between lengthened and shortened states by relative axial sliding of said two spool pieces, first and second lateral edges of said roll of said photographic film being clamped between said two flanges when said spool is in said shortened state; and a cam mechanism associated with said second and fourth ends for causing said spool to change from said lengthened state to said shortened state when said spool is rotated in said film unwinding direction, so as to cause said roll to rotate together with said spool, whereby said leader is advanced outward from said cassette shell during rotation of said roll in said film unwinding direction.

9. A photographic film cassette as claimed in claim 8, said locking means being set in said unlocked state in response to closing a door of a cassette chamber of a camera which is loaded with said cassette shell.

10. A photographic film cassette as claimed in claim 9, further comprising:

a preventing device engaged with said second spool piece so as to prevent said second spool piece from sliding axially relative to said cassette shell.

11. A photographic film cassette as claimed in claim 10, a trailer of said photographic film being 12. A photographic film cassette as claimed in claim 11, an end face of said cassette shell having a through hole formed therein proximate said locking means, said through hole receiving an unlocking pin formed on the camera so as to set said locking means to said unlocked state.

13. A photographic film cassette as claimed in claim 12, said locking means being associated with said second spool piece, and said unlocking pin projecting from said door.

14. A photographic film cassette as claimed in claim 13, said preventing device comprising:

a bearing portion formed inside said cassette shell for supporting said second core at a position close to said second flange; and a ring portion projected from around said second core, said bearing portion being between said second flange and said ring portion.

15. A photographic film cassette as claimed in claim 14, said locking means comprising:

a sleeve formed on said third end of said second spool piece;

a stopper member slidably contained within said sleeve and adapted to coming into contact with a lateral inner wall of said cassette shell, said stopper member being moved out of contact with said lateral inner wall when said unlocking pin is inserted through said through hole so as to press said stopper member; and a biasing member disposed within said sleeve for biasing said stopper member into contact with said lateral inner wall of said cassette shell, said spool rotating against friction between said stopper member and said lateral inner wall when a torque of at least said predetermined value is applied thereto.

16. A photographic film cassette as claimed in claim 14, said locking means comprising:

a toothed wheel formed on said third end of said second spool piece and contained in said cassette shell; and a locking spring disposed in said cassette shell for arresting said toothed wheel, said spring plate comprising:

a proximal portion fixed in said cassette shell;

a resilient extended portion extending from said proximal portion and disposed proximate said through hole; and an arcuate stopper projection disposed on a distal end of said extended portion said stopper projection extending into a spatial domain defined by passage of teeth of said toothed wheel, said teeth passing along said stopper portion when a torque of at least said predetermined value is applied to said toothed wheel, whereby said toothed wheel is allowed to rotate, and said stopper portion being shifted out of said spatial domain defined by said teeth when said extended portion is pressed by said unlocking pin.

17. A photographic film cassette as claimed in claim 16, wherein;

a leading end of said leader is cut at a slant so as to define a first projecting portion of a first lateral edge of said film; and said trailer having a second projecting portion on a side of a second lateral edge of said film, which is opposite said first lateral edge.

18. A photographic film cassette as claimed in claim 17, wherein; said photographic film has perforations formed therein so as to be arranged along said first lateral edge, an information recording portion is arranged along said second lateral edge of said film for recording information, and said first end of said spool is disposed on a side of said first lateral edge and is engaged with said camera so as to be driven by said camera.

19. A photographic film cassette as claimed in claim 18, said information recording portion being a magnetic recording area on which said information is magnetically recorded.

20. A photographic film cassette as claimed in claim 14, wherein, when said first spool piece is initially rotated in said film unwinding direction, said spool changes from said lengthened state to said shortened state by sliding towards said second spool piece, and subsequently, said first and second spool pieces rotate integrally with each other while maintaining said shortened state.

21. A photographic film cassette as claimed in claim 20, further comprising:

a circumferential lip formed to project from a peripheral edge of said first flange toward said roll in order to come into contact with said first lateral edge of said outermost turn of said roll, said circumferential lip being adapted for cooperation with said second flange to tightly clamping said lateral edges of said outermost turn of said roll so as to prevent said roll from loosening when said spool assumes said shortened state, said second flange being flat; and a separator claw formed in said cassette shell so as to separate said leader from said roll while said roll rotates in said film unwinding direction together with said spool.

22. A photographic film cassette as claimed in claim 21, wherein said cam mechanism includes a first cam follower and a first cam groove for receiving said cam follower therein.

23. A photographic film cassette as claimed in claim 22, said first cam groove being formed in said first spool piece.

24. A photographic film cassette as claimed in claim 23, said displacement allowing means comprising:

a sleeve formed on said second end of said first core; and a guide shaft formed in said fourth end of said second core, said guide shaft being inserted in said sleeve.

25. A photographic film cassette as claimed in claim 24, further comprising:

a second cam follower formed on said second spool piece at a position which is rotationally symmetrical with said first cam follower; and a second cam groove formed on said first spool piece at a position which is rotationally symmetrical with said first groove.

26. A photographic film cassette as claimed in claim 25, wherein at least two positioning holes are formed in an end face of said cassette shell which corresponds to said first end, said positioning holes receiving positioning projections of said camera when said camera is loaded with said cassette shell so as to define a direction in which said passage mouth is directed within said camera.

27. A photographic film cassette as claimed in claim 25, further comprising:

an engaging portion formed on said cassette shell to be engaged with an engaging member of said camera for preventing said cassette shell from being dropped out of said camera, when a bottom opening through which said cassette shell has been inserted is directed downward, during removal of said cassette shell from said camera.

28. A photographic film cassette as claimed in claim 25, further comprising:

data signaling means formed on said cassette shell so as to represent data relating to a characteristic of said photographic film, said data being detected by said camera; and use-condition signaling means formed on said cassette shell adjacent to said data signaling means so as to represent a condition of use of said photographic film, said condition of use represented by said use-condition signaling means being detected by said camera.

29. A photographic film cassette as recited in claim 7, wherein said predetermined value is 50 gf cm.

30. A photographic film cassette in which photographic film is wound on a spool rotatably contained in a cassette shell, and in which a leader of said photographic film is advanced outward from a passage mouth when said spool is rotated, said cassette comprising:

locking means provided inside said cassette shell for stopping rotation of said spool when a rotational torque of less than a predetermined value is applied to said spool and for allowing said spool to rotate when a rotational torque of at least said predetermined value is applied to said spool, said locking means being set in an unlocked state, in which said spool can freely rotate, when said cassette is loaded in said camera, said locking means comprising:

a toothed wheel formed proximate an end of said spool and contained in said cassette shell; and spring member disposed in said cassette shell so as to be biased into engagement with said toothed wheel, said spring member comprising:

a proximal portion fixed to said cassette shell;

a resilient extended portion extending from said proximal portion; and a stopper projection formed on a distal end of said extended portion so as to extend into a spatial domain defined by passage of teeth of said toothed wheel, said teeth passing along a surface of said stopper projection when a torque of at least said predetermined value is applied to said spool whereby said toothed wheel is allowed to rotate.

31. A photographic film cassette as claimed in claim 30, wherein said surface of said stopper projection is arcuate.

32. A photographic film cassette in which photographic film is wound on a spool rotatably contained in a cassette shell, and in which a leader of said photographic film is advanced outward from a passage which when said spool is rotated, said cassette comprising:

locking means provided inside said cassette shell for stopping rotation of said spool when a rotational torque of less than a predetermined value is applied to said spool and for allowing said spool to rotate when a rotational torque of at least said predetermined value is applied to said spool, said locking means being set in an unlocked state, in which said spool can freely rotate, when said cassette is loaded in a camera and a door of a cassette chamber of the camera is closed, said spool comprising first and second spool pieces;

said first spool piece including a first flange, a first core, a first end of said first core, which is supported by said cassette shell, and a second end which is opposite to said first end, said second spool piece including a second flange, a second core, a third end of said second core, which is supported by said cassette shell, and a fourth end which is opposite to said third end, said fourth end being associated with said second end;

displacement allowing means associated with said second and fourth ends for allowing said spool to change between lengthened and shortened states by relative axial sliding of said two spool pieces, first and second lateral edges of said roll of said photographic film being clamped between said two flanges when said spool is in said shortened state; and a cam mechanism associated with said second and fourth ends for causing said spool to change from said lengthened state to said shortened state when said spool is rotated in said film unwinding direction, so as to cause said roll to rotate together with said spool, whereby said leader is advanced outward from said cassette shell during rotation of said roll in said film unwinding direction.

33. A photographic film cassette in which photographic film is wound on a spool rotatably contained in a cassette shell, and in which a leader of said photographic film is advanced outward from a passage mouth when said spool is rotated, said cassette comprising:

locking means provided inside said cassette shell for stopping rotation of said spool when a rotational torque of less than a predetermined value is applied to said spool and for allowing said spool to rotate when a rotational torque of at least said predetermined value is applied to said spool, said locking means being set in an unlocked state, in which said spool can freely rotate, when said cassette is loaded in said camera and a door of a cassette chamber of the camera is closed;

an end face of said cassette shell having a through hole formed therein proximate said locking means, said through hole receiving said unlocking pin so as to set said locking means to said unlocked state said spool comprising first and second spool pieces;

said first spool piece including a first flange, a first core, a first end of said first core, which is supported by said cassette shell, and a second end which is opposite to said first end;

said second spool piece including a second flange, a second core, a third end of said second core, which is supported by said cassette shell, and a fourth end which is opposite to said third end, said fourth end being associated with said second end;

displacement allowing means associated with said second and fourth ends for allowing said spool to change between lengthened and shortened states by relative axial sliding of said two spool pieces, first and second lateral edges of said roll of said photographic film being clamped between said two flanged when said spool is in said shortened state; and a cam mechanism associated with said second and fourth ends for causing said spool to change from said lengthened state to said shortened state when said spool is rotated in said film unwinding direction, so as to cause said roll to rotate together with said spool, whereby said leader is advanced outward from said cassette shell during rotation of said roll in said film unwinding direction;

a trailer of said photographic film being anchored to said second spool piece by an anchoring device;

a preventing device engaged with said second spool piece so as to prevent said second spool piece from sliding axially relative to said cassette shell.

* * * * *